United States Patent [19]
Conradi et al.

[11] Patent Number: 5,959,013
[45] Date of Patent: Sep. 28, 1999

[54] PRODUCTION OF THICKENING AGENTS IN LIQUID STATE

[75] Inventors: Joachim Conradi, Duesseldorf; Wolfgang Gress, Wuppertal; Ralf Neumann, Haan; Ludwig Schieferstein, Ratingen; Heinz-Guenther Schulte, Muelheim, all of Germany

[73] Assignee: Henkel Kommanditgesellschaft auf Aktien, Duesseldorf, Germany

[21] Appl. No.: 08/983,566

[22] PCT Filed: Jun. 22, 1996

[86] PCT No.: PCT/EP96/02721

§ 371 Date: Dec. 29, 1997

§ 102(e) Date: Dec. 29, 1997

[87] PCT Pub. No.: WO97/02325

PCT Pub. Date: Jan. 23, 1997

[30] Foreign Application Priority Data

Jun. 30, 1995 [DE] Germany .......................... 195 23 837

[51] Int. Cl.$^6$ ................ C08J 5/10; C08K 5/06; C08L 75/08
[52] U.S. Cl. ............................ 524/378; 524/376; 524/377
[58] Field of Search .................................... 524/376, 377, 524/378

[56] References Cited

U.S. PATENT DOCUMENTS

| | | | |
|---|---|---|---|
| 4,079,028 | 3/1978 | Emmons et al. | 524/804 |
| 4,426,485 | 1/1984 | Hoy et al. | 524/591 |
| 4,636,326 | 1/1987 | Hernandez et al. | 252/77 |
| 5,378,756 | 1/1995 | Thies et al. | 524/591 |

FOREIGN PATENT DOCUMENTS

| | | |
|---|---|---|
| 36 30 319 | 3/1988 | Germany . |
| 43 10 702 | 10/1994 | Germany . |
| 06 025 597 | 2/1994 | Japan . |
| WO95/12650 | 5/1995 | WIPO . |

*Primary Examiner*—Samuel A. Acquah
*Assistant Examiner*—U. K. Rajguru
*Attorney, Agent, or Firm*—Ernest G. Szoke; Wayne C. Jaeschke; Real J. Grandmaison

[57] ABSTRACT

An aqueous thickener composition containing an organic water-dispersible or water-soluble polymeric thickener and a viscosity reducer comprising a compound corresponding to formula (1):

$$R^1-O-(R^2-O)_n-H \qquad (1)$$

in which
$R^1$ is an aliphatic hydrocarbon radical containing 8 carbon atoms,
$R^2$ represents an alkylene radical containing 2 to 4 carbon atoms, and
$n$ is an integer of 3 to 7.

16 Claims, No Drawings

PRODUCTION OF THICKENING AGENTS IN LIQUID STATE

BACKGROUND OF THE INVENTION

1. Field of the Invention

This invention relates to auxiliaries for formulating aqueous thickeners, more particularly based on polyurethanes, in liquid form and to aqueous thickener formulations produced with these auxiliaries. The invention also relates to the use of the thickener formulations in systems to be thickened, for example in water-based emulsion paints.

2. Discussion of Related Art

Polyurethane-based thickeners, of which the thickening properties can be described by an associative action mechanism, are suitable as auxiliaries for establishing Theological properties in water-based systems such as, for example, automotive and industrial lacquers, plasters and paints, printing inks and textile dyes, pigment printing pastes, pharmaceutical and cosmetic formulations, plant protection formulations and filler dispersions. The action mechanism of such thickeners is described, for example, in *Polymers Paint Colour Journal*, 181, 270 (1991). Besides polyurethanes, ethoxylated fatty alcohols additionally reacted in blocks or statistically with a small percentage of long-chain epoxides or nonionic polyacrylates or polyacrylamides partly esterified with long-chain fatty alcohols or even cellulose derivatives etherified with long alkyl chains may be used as associative thickeners in water-based systems. They are increasingly replacing or complementing the cellulose ethers traditionally used as thickeners in paints and lacquers and the traditional alkali-soluble polyacrylates. Associative thickeners have a number of advantages over conventional thickener systems including, for example,

- a lower viscosity during incorporation,
- a lower tendency to splash during application,
- better color,
- higher gloss through less flocculation,
- lower sensitivity of the coatings to water,
- less vulnerability to microbial infestation,
- minimal reduction in the viscosity of the thickened dispersions on exposure to shearing (approaching newtonian flow behavior).

The production and use of such thickeners is described, for example, in U.S. Pat. No. 4,079,028 and in U.S. Pat. No. 4,426,485.

Although polyurethane-based thickeners have a far lower viscosity than polyacrylates or cellulose ethers for the same thickening effect, the formulation of polyurethane-based liquid thickeners still involves difficulties. In the form of aqueous solutions, known polyurethane thickeners have a very high viscosity which makes them very difficult to incorporate in aqueous systems.

Various attempts have been made in the past to reduce the viscosity of polyurethane thickeners. For example, their molecular weight has been reduced although this resulted in a seriously diminished thickening effect.

A standard method for reducing the viscosity of aqueous polyurethane thickener solutions is to add water-soluble low molecular weight solvents such as, for example, water-soluble monohydric or polyhydric alcohols. Serious disadvantages of this method are the deterioration in the performance properties, for example spreadability or stability, and the increased emission of volatile solvents.

The above-mentioned disadvantages of using low molecular weight solvents in thickener formulations can be overcome, for example, by supplying and processing the thickener in solid form. However, the disadvantages of formulating the thickener in solid form lie in additional process steps both during the production and subsequent processing of the thickener. In the first case, the thickener has to be isolated from the reaction medium and converted into powder form whereas, in the second case, the powder first has to be converted into a processable form by dissolution or swelling before or during its intended use so that final application is possible.

The possibility of reducing the viscosity of thickener systems by adding relatively large quantities of water appears uneconomical because it would involve an unwanted production in the concentration of active substance and, hence, an increase in the quantity applied.

Now, according to DE-A-43 10 702, alkoxylated alcohols or phenols may be added to reduce the viscosity of aqueous solutions of polyurethane thickeners, although they have to be used in high concentrations to achieve an adequate reduction in the viscosity of the thickener. The document in question also discloses the use of 2,4,7,9-tetramethyl-5-decine-4,7-diol in quantities of up to 25% by weight for reducing viscosity in aqueous thickener systems.

DE-A-36 30 319 describes the synthesis of polyurethane-based thickeners which themselves have a low viscosity. This document mentions the use of ethoxylated alcohols as "solubilizee". The adduct of 60 moles of ethylene oxide (EO) with 1 mole of tallow alcohol and the adduct of 12 moles of EO with nonylphenol are mentioned as examples of such solubilizers.

U.S. Pat. No. 4,636,326 discloses the use of mixtures of known polyurethane thickeners with dimer fatty acid esters in aqueous hydraulic fluids. The document in question mentions the use of nonionic surfactants as additive-dispersing auxiliaries. It does not refer to the use of ethoxylated fatty alcohols for reducing the viscosity of hydraulic fluids, nor does it mention such an effect.

Accordingly, the problem addressed by the present invention was to avoid the disadvantages mentioned in the foregoing and to provide a thickener formulation which would have a low viscosity and which would therefore be easy to handle. At the same time, however, the original properties of the thickener when used as intended in aqueous solution would remain largely intact.

It has now surprisingly been found that even an addition of about 10% by weight of adducts of 3 to 7 moles of EO and/or propylene oxide (PO) with short-chain fatty or Guerbet alcohols generally reduces the viscosity of aqueous thickener formulations to such an extent that the aqueous thickener formulations are convenient to handle.

DESCRIPTION OF THE INVENTION

The present invention relates to an aqueous thickener formulation at least containing an organic, water-dispersible or water-soluble polymeric thickener and a nonionic surfactant as viscosity reducer, characterized in that the viscosity reducer contains at least one compound corresponding to formula (1):

$$R^1\text{—O—}(R^2\text{—O})_n\text{—H} \tag{1}$$

in which $R^1$ is an aliphatic hydrocarbon radical containing 6 to 10 carbon atoms and, more particularly, 8 carbon atoms, $R^2$ represents alkylene radicals containing 2 to 4 carbon atoms and n is an integer of 3 to 7.

In the context of the invention, water-dispersible or water-soluble thickeners are understood in particular to be thickeners which act by the associative mechanism. These include, for example, polyacrylates and polyacrylamides partly etherified with long-chain fatty alcohols, long-chain cellulose alkyl ethers and, in particular, polyether polyurethanes.

The polyether polyurethanes, which are preferred for the purposes of the invention, are generally the reaction product of 2 moles of polyether polyols each containing an OH function with 1 mole of molecules containing on average two isocyanate groups.

Suitable polyether polyols are, for example, the polymerization products of ethylene oxide, propylene oxide and/or butylene oxide, copolymerization or graft polymerization products thereof, polyethers obtained by condensation of polyhydric alcohols or mixtures thereof and polyethers obtained by alkoxylation of monohydric or polyhydric alcohols, amides, polyamides and aminoalcohols. These polyether polyols are preferably so strongly hydrophilic that they are soluble in water. Polyether polyols which at least predominantly contain polyalkylene glycols, preferably polyethylene glycols or polypropylene glycols, are generally used for the production of thickeners. The number of polyoxyalkylene units present in the polyalkylene glycol may vary between about 20 and about 400, the best results in terms of handling behavior and effect being obtainable with an average polyoxyalkylene group content of about 150 to 250.

Suitable isocyanate-bearing molecules are both low molecular weight aliphatic and/or aromatic diisocyanates and so-called "chain-extended" isocyanates produced by reaction with preferably dihydric alcohols.

Examples of suitable isocyanates are 1,5-naphthylene diisocyanate, 4,4'-diphenyl methane diisocyanate (MDI), hydrogenated MDI ($H_{12}$ MDI), xylylene diisocyanate (XDI), tetramethyl xylene diisocyanate (TMXDI), di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate (TDI), optionally in combination, 1-methyl-2,4-diisocyanato-cyclohexane, 1,6-diisocyanato-2,2,4-trimethyl hexane, 1-isocyanatomethyl-3-isocyanato-1,5,5-trimethyl cyclohexane, chlorinated and brominated diisocyanates, phosphorus-containing diisocyanates, tetramethoxybutane-1,4-diisocyanate, tetramethylene-1,4-diisocyanate, pentamethylene-1,4-diisocyanate, hexamethylene-1,4-diisocyanate (HDI), phthalic acid-bis(isocyanatoethyl ester), dicyclohexyl methane diisocyanate, 1,12-diisocyanatododecane and dimer fatty acid diisocyanate.

Dimer fatty acid is a mixture of predominantly $C_{36}$ carboxylic acids which is obtained by thermal or catalytic dimerization of unsaturated $C_{18}$ monocarboxylic acids, such as oleic acid, tall oil fatty acid or linoleic acid. Dimer fatty acid may be reacted to form dimer fatty acid diisocyanates containing on average two isocyanate groups per molecule.

Besides the low molecular weight polyisocyanates, chain-extended isocyanates may also be used. This form of the polyisocyanates may be obtained by reacting about x moles of a preferably on average dihydric alcohol with about x+1 moles of an on average difunctional diisocyanate. The average number of isocyanate groups in the reaction product is always two whereas the molecular weight of the resulting diisocyanate increases with increasing x. Suitable dihydric alcohols are glycols, such as ethylene glycol, propylene glycol, butylene glycol and higher homologs thereof. Dimer alcohols obtainable by reduction of dimer fatty acid esters are also suitable. Alcohols and alcohol cuts which are obtained, for example, by transesterification of triglycerides with monohydric, dihydric or trihydric alcohols and which are on average difunctional may also be used for the production of the thickeners. However, the adducts of ethylene oxide and/or propylene oxide with dihydric alcohols, such as ethylene glycol, propylene glycol or butylene glycol, the number of alkylene oxide groups added on being between 1 and 500, preferably between 10 and 200 and more preferably between 20 and 150, are preferably used for the chain extension of the isocyanates. Reaction products where x=1 or x=2 are particularly preferred in this regard.

The chain-extended diisocyanates obtainable in this way are generally reacted with monofunctional polyether polyols. These polyether polyols are preferably the addition products of α-epoxides containing 2 to 24 carbon atoms with monohydric alcohols containing 1 to 24 and preferably 6 to 18 carbon atoms. The resulting polyether polyols may be both homopolymerization and copolymerization products.

The NCO:OH ratio is generally between about 0.9 and 1.1:1, a ratio of about 1:1 being preferred.

The polyurethane molecules are preferably linear and generally have an average molecular weight of 5,000 to 500,000. For certain applications, it can be useful to limit the molecular weight to a maximum of 100,000 or 10,000.

The polyethers of formula (1) used as viscosity reducers may be obtained in known manner by addition of ethylene oxide and/or propylene oxide onto monohydric alcohols. In a preferred embodiment of the invention, 1 to 10 molecules and, more particularly, 3 to 7 molecules of ethylene oxide and/or propylene oxide are added on per alcohol molecule. In the case of mixed polyethers, the addition reaction may be carried out blockwise or statistically.

To obtain a product active in accordance with the invention, the alcohol present in the viscosity reducer should contain 6 to 10 carbon atoms and, more particularly, 8 carbon atoms. The alcohol should generally be aliphatic; unsaturated, saturated and cyclic, linear and/or branched alcohols may be used, although saturated linear and/or branched alcohols are particularly suitable. Examples of such alcohols are hexanol, heptanol, octanol, nonanol, decanol, the isomers of isooctanol, for example 2-ethylhexanol, and the branched isomers of hexanol, heptanol, nonanol and decanol.

The thickener formulations according to the invention contain the corresponding thickener, the viscosity reducer, water and optionally other additives in small quantities.

According to the invention, preferred thickener formulations are those which essentially contain 1 to 50% by weight of viscosity reducer, 99 to 10% by weight of organic water-dispersible or water-soluble polymeric thickener and water. In one preferred embodiment, the thickener formulation contains 5 to 20% by weight of viscosity reducer, 50 to 10% by weight of thickener and water. The percentage contents of the components mentioned generally add up to about 100% by weight, the balance to 100% by weight preferably consisting of typical additives and not exceeding 5% by weight and, more particularly, 2% by weight. Such additives include, for example, biocides, small quantities of volatile solvents and optionally antioxidants.

The thickener formulation preferably contains a thickener bearing urethane groups.

The thickener formulations according to the invention are distinguished by the fact that, despite their low viscosity, they give substantially clear homogeneous solutions of the thickener in the aqueous medium. Flocculation phenomena which can lead to reduced gloss in polymeric coatings do not normally occur. The viscosity reducers according to the invention in the thickener formulation generally have no adverse effect on the effectiveness of the thickener in the concentration used. Despite the presence of the viscosity reducer, the thickened products exhibit virtually identical rheological behavior which is distinguished by the fact that the thickening effect is largely unaffected by shearing.

Accordingly, the present invention also relates to the use of aqueous thickener formulations in coating compositions based on aqueous dispersions.

The invention also relates to water-based emulsion paints which contain a thickener formulation according to the invention in addition to pigments, binders, solvents and optionally other additives.

However, the thickener formulations may also be used in any other aqueous media where effective thickening is required. These include products for industrial application, for example aqueous hydraulic fluids, and products for personal and domestic hygiene and also cosmetic products.

In addition, the invention relates to the use of compounds corresponding to formula (1):

$$R^1\text{—}O\text{—}(R^2\text{—}O)_n\text{—}H \qquad (1)$$

in which
- $R^1$ is an aliphatic hydrocarbon radical containing 6 to 10 carbon atoms and, more particularly, 8 carbon atoms,
- $R^2$ represents alkylene radicals containing 2 to 4 carbon atoms and
- n is an integer of 3 to 7, as viscosity reducers in aqueous thickener formulations.

EXAMPLES

To test the viscosity-reducing effect of the viscosity regulators, the viscosity of an 18.2% solution of a polyurethane-based thickener (NOPCO® DSX 3116, Henkel) in water was determined before and after the addition of 10% of viscosity reducer (Brookfield, 25° C., 20 r.p.m., spindle 3 to 6). The results are set out in Table 1.

The adducts of various quantities of ethylene oxide (EO) and propylene oxide (PO) or mixtures thereof with fatty or Guerbet alcohols were used as the viscosity reducers.

TABLE 1

| Viscosity reducer | Viscosity [mPas] | Appearance |
|---|---|---|
| — | 82,000 | Whitish opaque |
| $C_8$/2EO | 1,000,000 | Slightly opaque |
| $C_8$/4EO | 1,200 | Clear |
| $C_8$/1PO/6–7EO | 14,400 | Opaque |
| $C_{12}$/3EO | 2,600,000 | Opaque |
| $C_{12/14}$/2EO | 1,650,000 | Opaque |
| $C_{12/14}$/3EO | 2,800,000 | Opaque |
| $C_{12/14}$/4EO | 1,000,000 | Opaque |
| $C_{12/14}$/6EO | 58,000 | Slightly opaque |
| $C_{12/14}$/7EO | 66,000 | Slightly opaque |
| 2-Ethylhexanol | Thickened, cannot be measured | White |
| 2-Ethylhexanol/2EO | 432,000 | White |
| 2-Ethylhexanol/3EO | 21,500 | Clear |
| 2-Ethylhexanol/4EO | 3,000 | Clear |
| 2-Ethylhexanol/5EO | 2,800 | Clear |
| Propylene glycol | 50,000 | Whitish opaque |
| Butylene glycol | 2,000 | Whitish opaque |
| Butylene diglycol | 14,000 | Whitish opaque |

Table 1 clearly reflects the superiority of the ethoxylates of linear and branched $C_8$ alcohols to the ethoxylates of higher fatty alcohols and to low molecular weight solvents.

What is claimed is:

1. An aqueous thickener composition containing an organic water-dispersible or water-soluble polymeric thickener and a viscosity reducer, said viscosity reducer comprising a compound corresponding to formula (1):

$$R^1\text{—}O\text{—}(R^2\text{—}O)_n\text{—}H \qquad (1)$$

in which
- $R^1$ is an aliphatic hydrocarbon radical containing a carbon atoms,
- $R^2$ represents an alkylene radical containing 2 to 4 carbon atoms, and
- n is an integer of 3 to 7.

2. A thickener composition as in claim 1 containing 1% to 50% by weight of said viscosity reducer, 99% to 10% by weight of said polymeric thickener and water.

3. A thickener composition as in claim 1 wherein said polymeric thickener contains urethane groups.

4. A thickener composition as in claim 1 present in an aqueous coating composition.

5. A thickener composition as in claim 1 present in an aqueous emulsion paint.

6. A thickener composition as in claim 5 wherein said emulsion paint contains pigments, binders and solvents.

7. A thickener composition as in claim 1 wherein said polymer thickener comprises a polyether polyurethane.

8. A thickener composition as in claim 7 wherein said polyether polyurethane comprises the reaction product of 2 moles of polyether polyols each containing an OH function with 1 mole of molecules containing on average 2 isocyanate groups.

9. The process of reducing the viscosity of an aqueous thickener composition containing an organic water-dispersible or water-soluble polymeric thickener, comprising mixing said composition with a viscosity reducer comprising a compound corresponding to formula (1):

$$R^1\text{—}O\text{—}(R^2\text{—}O)_n\text{—}H \qquad (1)$$

in which
- $R^1$ is an aliphatic hydrocarbon radical containing 8 carbon atoms,
- $R^2$ represents an alkylene radical containing 2 to 4 carbon atoms, and
- n is an integer of 3 to 7.

10. A process as in claim 9 wherein said composition contains 1% to 50% by weight of said viscosity reducer, 99% to 10% by weight of said polymeric thickener and water.

11. A process as in claim 9 wherein said polymeric thickener contains urethane groups.

12. A process as in claim 9 wherein said composition comprises an aqueous coating composition.

13. A process as in claim 9 wherein said composition comprises an aqueous emulsion paint.

14. A process as in claim 13 wherein said emulsion paint contains pigments, binders and solvents.

15. A process as in claim 9 wherein said polymer thickener comprises a polyether polyurethane.

16. A process as in claim 15 wherein said polyether polyurethane comprises the reaction product of 2 moles of polyether polyols each containing an OH function with 1 mole of molecules containing on average 2 isocyanate groups.

* * * * *